United States Patent [19]

John, Jr.

[11] 3,723,647

[45] Mar. 27, 1973

[54] APPARATUS FOR RECORDING TELEVISION IMAGES ON FILM

[75] Inventor: Robert S. John, Jr., Deerfield, Ill.

[73] Assignee: Bell & Howell Company, Chicago, Ill.

[22] Filed: Apr. 20, 1972

[21] Appl. No.: 246,051

[52] U.S. Cl.............178/6.7 R, 178/6.6 P

[51] Int. Cl. ........................................G 11b7/00

[58] Field of Search..178/6.6 R, 6.6 TC, 6.7 R, 6.7 A

[56] References Cited

UNITED STATES PATENTS 3,317,663 5/1967 Van Dam............................178/6.6 P

*Primary Examiner*—Terrell W. Fears

*Attorney*—William K. Serp et al.

[57] ABSTRACT

An apparatus for synchronizing the operation of a motion picture camera to a television receiver to prevent "shutter bars" in the projected film image. The vertical retrace pulses from the television receiver are sensed, amplified and fed to an energy storage counter. The storage counter provides one output pulse for every fourth retrace pulse. The output of the storage counter is fed to one input of a bistable multivibrator. The camera includes a 180° rotary shutter coupled to a pulse generator. The output of the pulse generator is fed to the second input of the multivibrator and the output of the multivibrator controls the camera motor. In this manner, the speed of the camera shutter is synchronized to the television retrace signal and the shutter phase angle with respect to the retrace signal remains constant.

10 Claims, 1 Drawing Figure

PATENTED MAR 27 1973 3,723,647
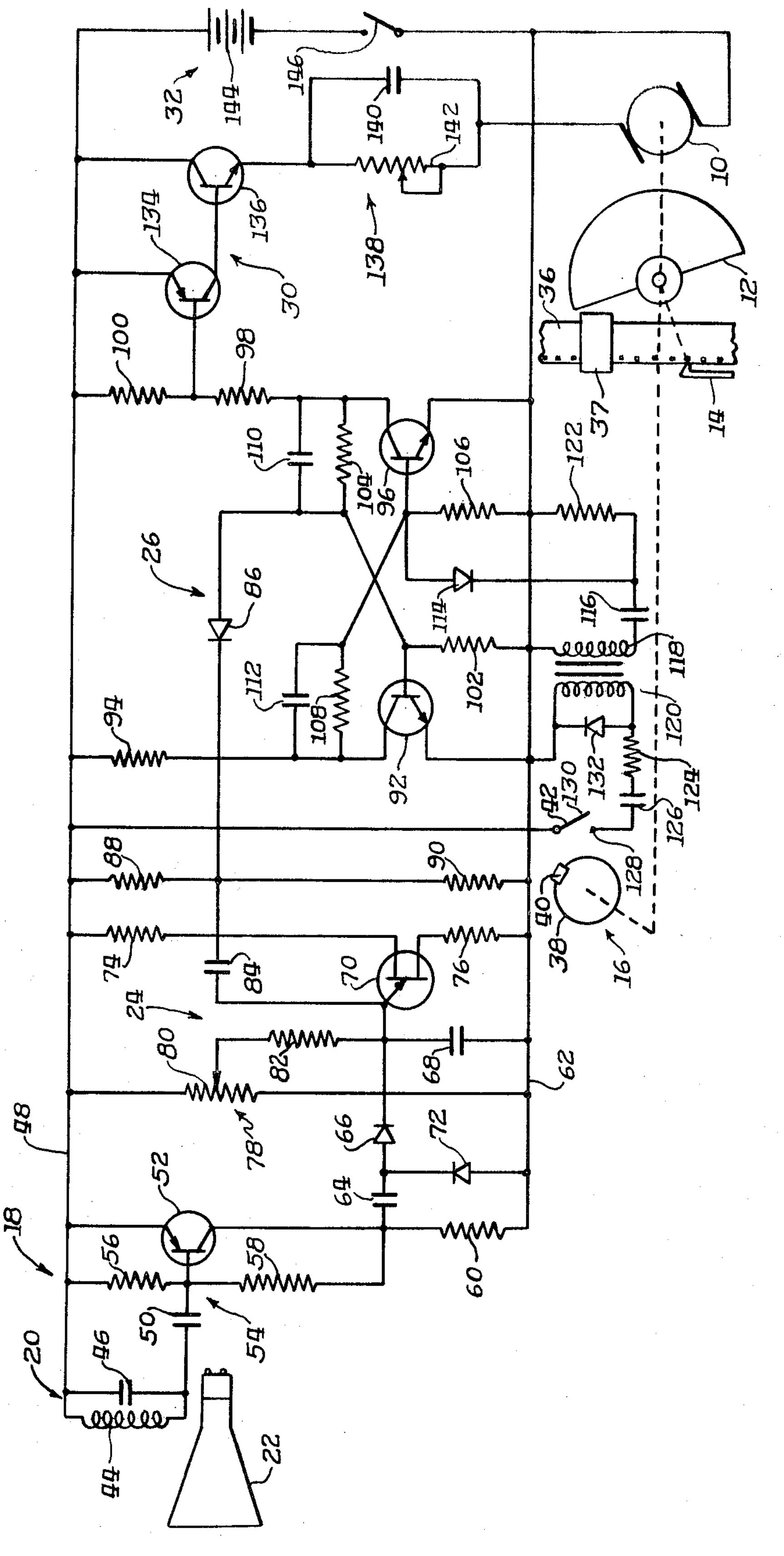

APPARATUS FOR RECORDING TELEVISION IMAGES ON FILM

This invention generally relates to an apparatus for controlling the operation of a motion picture camera, and more particularly relates to an apparatus for synchronizing a motion picture camera with a television receiver to eliminate "shutter-bars" during the filming of the image produced by the television cathode ray tube.

It is often desirable to photograph the image which appears on the screen of the cathode ray tube of a television receiver. The developed film may then be projected upon a larger screen for group viewing or retained for future use. Various systems have been heretofore proposed to accomplish this end; however, due to their complexity and the necessity of extensive television receiver modification, they are not suitable for use with consumer motion picture cameras.

A television image is generated by means of a series of individual horizontal traces progressing vertically across the face of the tube and periodically retracing their path at a high rate so as to produce the illusion of a continuous picture. The television picture is produced at a rate of 30 consecutive frames per second with each frame created by two complete interlaced field scans at 1/60 second intervals. The scans are controlled by the transmitted retrace blanking signal. Each frame is composed of 525 lines in two interlaced field scans. Consumer motion picture cameras on the other hand expose the film at a typical rate of eighteen frames per second. In reproducing television images on a photographic film, the scene being photographed is interrupted 30 times per second. Therefore, only a portion of a single television frame appears on the television screen during the exposure time of a motion picture frame, depending on the camera shutter opening angle. Such variations in the frame exposure time will not result in an over or under exposure of a whole frame. Rather there will be a lack of exposure or a multiple exposure of certain parts of the film frame depending upon the relation of the shutter phase and film frame speed to the television frame rate. It is not sufficient to simply change the camera frame rate to approximately an integral submultiple of the television field rate, since both the camera frame rate and shutter opening angle must be precise. When the film frame exposure time is more than an integral number of television frames, a lateral area of the film frame in the region of the overlap of the partial scans will be over-exposed. Conversely, when the film frame exposure time is less than an integral number of television frames, that portion of the frame not exposed to the partial scans will be underexposed. Under certain camera speeds both conditions may exist. The resulting light or dark areas are generally referred to as "shutter bars" and move vertically through the projected film image unless there is synchronization with the television frame rate. The width of the "shutter bars" will also vary with any change in the exposure time per film frame. In any event, the appearance of a shutter bar in the projected film image is objectionable.

For a television picture to be filmed without any "shutter bars", it is necessary that the camera shutter be opened over each portion of the film frame during one passage of the image of the television scan beam. In general, to accomplish this satisfactorily, the shutter blade must move unidirectionally such as in the case with a rotating shutter blade. These requirements can be further expressed by stating that the open periods of the shutter blade should equal one television frame period. For a camera frame rate of 18 fps it will be appreciated that 216° is the effective shutter blade angle. Thus a 216° open shutter would produce no "shutter bars" in television pictures made at 18 frames per second. Similarly, a 24 fps camera requires a shutter angle of 288° and a 15 fps camera an angle of 180°. Unfortunately, for each of the above conditions to produce a satisfactory picture the camera rate should remain at exactly the specified value. As a practical matter, it is preferable to synchronize the camera and television frame rates together at some convenient camera rate such as 15 fps and include a 180° camera shutter blade.

Various arrangements have been suggested for solving the aforementioned problem, however, such prior systems have generally required interconnection to and even modification of the television receiver. This complication makes their use for consumer products prohibitive. It is a main object of this invention to provide an apparatus for controlling the operation of a motion picture camera to permit the filming of an image produced by a television cathode ray tube without the creation of "shutter bars" upon the film image, and without modification to the television receiver.

Other objects and advantages of this invention will be apparent from the description of the accompanying drawing wherein the single FIGURE is a schematic diagram, with certain components symbolically illustrated, of a preferred embodiment of this invention.

Briefly, the illustrated embodiment includes a motion picture camera with its drive motor 10 coupled to a rotary shutter 12 and an intermittent film shuttle mechanism 14. The camera additionally includes a signal generating means 16 which provides an output pulse for each film frame as it passes through the camera. The illustrated control circuit includes a detection means 18 serving to detect the vertical sync pulses in the television set by a coupling means 20 positioned adjacent to the neck of the television cathode ray tube 22. the vertical television synchronization pulses are fed to a frequency translation means 24 in the form of a frequency divider which provides an output signal after the occurrence of a fixed number of synchronization pulses. In the illustrated embodiment, the frequency translator 24 divides by four, thus converting the sixty hertz vertical synchronization pulses to fifteen hertz pulses. The output of the frequency translator is fed to a switching means in the form of a bistable multivibrator 26. The multivibrator 26 is responsive to the pulses from the translator 24 as well as to frame pulses from the generating means 16 in the camera. The multivibrator controls a camera speed control circuit 30 connected in series with the camera motor 10, and a power source 32. The camera motor 10 is maintained in synchronization with the television vertical synchronization pulses and operates at one-fourth the speed of the synchronization pulses or at a 15 frame per second exposure rate.

As symbolically illustrated, the camera includes the motor 10. The motor shaft is coupled to the rotary shutter 12 and to the intermittent film drive shuttle mechanism 14. The teeth of the shuttle engage the sprocket holes of a film 36 drawing the film intermittently across an exposure aperture 37 of the camera. As illustrated, the shutter 12 defines a 180° shutter angle and rotates at a rate of 15 revolutions per second creating an exposure rate of 15 frames per second. It should be appreciated that since the shutter 12 defines a 180° shutter angle and is rotated at 15 revolutions per second, the film 36 is exposed for 1/30th of a second. This 1/30th of a second interval corresponds to a complete television frame upon the television screen which in turn is composed of two traces. That is, each television frame on the cathode ray tube of the receiver corresponds to two 1/60th second field scans. Thus, the film 36 is exposed to the television picture for alternate television frames. Additionally, the drive shaft of the motor is coupled to a gear 38 which forms part of the camera pulse generating means 16. The gear carries a magnet 40 which is juxtapositioned with respect to a reed switch 42. As the gear 38 reaches a predetermined position with the magnet adjacent the reed switch 42 the switch closes thereby generating a pulse. Since the magnet and switch contacts maintain a fixed position in relation to the shutter 12 blade cycle, the switch closure relates to both the frame rate and the shutter blade phase angle.

Serving to detect the vertical synchronization pulses generated by the television receiver, the coupling means includes an LC circuit. The LC circuit comprises an inductance 44 in parallel with a suitable capacitor 46, so as to tune the LC circuit to 60 hertz, thereby attenuating other extraneous signals. The inductance 44 is positioned adjacent the neck of the television tube, so as to conveniently pick up the synchronization pulses. One terminal of the LC circuit is connected to a positive bus 48 and the remaining end is connected through a coupling capacitor 50 to the base of a PNP amplifying transistor 52. The base of amplifying transistor 52 is biased by means of a resistive divider 54 including resistances 56 and 58 which are connected between the transistor collector and the positive bus of the supply. The common junction of the resistive divider 54 is connected to the base of the amplifying transistor 52. The emitter is connected to the positive bus of the supply and the collector current passes through a collector load resistor 60 to a negative bus 62.

The amplified synchronization signals developed across the collector load resistor 60 are fed to the frequency translator 24 which is in the form of an energy storage counter and which serves to translate the 60 hertz synchronization pulse rate to a fifteen hertz rate. The energy storage counter includes a first capacitor 64 which is coupled through a positive pulse rectifying diode 66 to a second capacitor 68. The common junction of the diode 66 and the second capacitor 68 are connected to the emitter of a unijunction level sensing transistor 70. Connected between the junction of the first capacitor 64 and the positive pulse rectifying diode 66 is a negative pulse clamping diode 72 which references the negative going pulse portions to the negative bus 62. The first and second capacitors 64 and 68 form a voltage divider charged by the positive going portion of the synchronization pulse. When the charge upon the second capacitor 68 reaches a predetermined level, which in the illustrated embodiment is equivalent to the occurrence of four synchronization pulses, the unijunction transistor 70 conducts causing a current to flow therethrough. The first base of the unijunction transistor is connected through a biasing resistor 74 to the positive bus and the second base of the unijunction transistor is connected through a resistor 76 to the negative bus. Serving to compensate for any leakage in the second capacitor 68 or diodes 66 and 72, and therefore assure stable operation of the firing point of the unijunction transistor 70 is a biasing network 78 comprising an adjustable resistor 80 connected between the positive and negative supply terminals. The wiper of the adjustable resistor 80 is connected through a fixed limiting resistor 82 to the emitter of the unijunction transistor 70. Thus, in the idle condition, the positive bias upon the emitter is determined by the position of the adjustable resistor 80, and the leakage characteristics of the second capacitor 68. in this manner, the circuit compensates for any leakage current through the second capacitor 68. The emitter of the unijunction transistor 70 is coupled through a capacitor 84 to the cathode of a coupling diode 86. Serving to reverse bias the coupling diode 86, thereby setting the diode forward conduction point, is a resistive divider comprising resistor 88, 90, connected to the positive and negative buses. The common junction of the resistors 88 and 90 is connected to the cathode of the diode 86.

The multivibrator 26 includes a first NPN transistor 92 having the emitter thereof connected to the negative or ground bus 62 of the supply, and the collector connected through a collector resistor 94 to the positive bus 48. Similarly, the circuit includes a second NPN transistor 96 the emitter of which is also connected to the ground bus 62 and the collector of which is connected through first 98 and second 100 resistors comprising a voltage divider, to the positive bus 48 of the supply. The base of the transistor 92 is biased through a pair of biasing resistors 102, 104, from the collector of the second resistor 96 to the negative bus 62. The common junction between the resistors 102, 104 is connected to the base of the first multivibrator transistor 92. Similarly, the second transistor 96 is biased by means of base biasing resistors 106 and 108 from the collector of the first transistor to the negative bus 62, the base being connected to the common junction of the biasing resistors. The biasing resistors 104 and 108 are connected in parallel with cross-coupling capacitors 110 and 112 respectively. The anode of the coupling diode 86 from the emitter of the unijunction transistor 70 is connected to the base of the first multivibrator transistor 92 and serves to trigger this transistor "off" by a negative going pulse in response to the firing of the unijunction transistor 70.

The base of the second transistor 96 is coupled through a diode 114 the anode of which is connected to the base of the transistor 96 and the cathode of which is connected through a capacitor 116 to the secondary 118 of an isolation transformer 120. 88 and 90 is connected to the cathode of the diode 86.

The multivibrator 26 includes a first NPN transistor 92 having the emitter thereof connected to the negative or ground bus 62 of the supply, and the collector connected through a collector resistor 94 to the positive bus 48. Similarly, the circuit includes a second NPN transistor 96 the emitter of which is also connected to the ground bus 62 and the collector of which is connected through first 98 and second 100 resistors comprising a voltage divider, to the negative bus 48 of the supply. The base of the first transistor 92 is biased through a pair of biasing resistors 102, 104, from the collector of the second resistor 96 to the negative bus 62. The common junction between the resistors 102, 104 is connected to the base of the first multivibrator transistor 92. Similarly, the second transistor 96 is biased by means of base biasing resistors 106 and 108 from the collector of the first transistor to the negative bus 62. The base being connected to the common junction of the biasing resistors. The biasing resistors 104 and 108 are connected in parallel with cross-coupling capacitors 110 and 112 respectively. The anode of the coupling diode 86 from the emitter of the unijunction transistor 70 is connected to the base of the first multivibrator transistor 92 and serves to trigger this transistor "on" by a negative going pulse in response to the firing of the unijunction transistor 70.

The base of the second transistor 96 is coupled through a diode 114 the anode of which is connected to the base of the transistor 96 and the cathode of which is connected through a capacitor 116 to the secondary 118 of an isolation transformer 120. The remaining terminal of the secondary of the transformer 120 is connected to the negative bus 62 of the supply and a diode return resistor 122 is connected from the common junction of the coupling capacitor 116 and the cathode of the diode 114 to the negative bus 62. One terminal of the primary of the transformer 120 is connected through a current limiting resistor 124 in series with a coupling capacitor 126 to a fixed contact 128 of the camera reed switch 42. A movable contact 130 of the switch 42 is terminated at the positive bus 48 of the supply. Serving to suppress positive peaks which may develop across the transformer 120 is a suppressor diode 132, the cathode of which is connected to the negative bus. Thus, in response to a closure of the reed switch 42 a pulse is coupled through the transformer. The negative going pulse passes through transformer and through the coupling diode 114 to the base of the second transistor 96 turning this transistor off and switching on the first transistor 92. When the unijunction transistor 70 fires, a negative going pulse is similarly coupled through the unijunction coupling diode 86 to the base of the first transistor 92 turning this transistor off and turning on the second transistor 96. Turn-off of the second transistor 96 removes the potential between the common junction of the collector resistors 98, 100, and turns off the camera speed control circuitry 30.

The camera speed control circuitry 30 comprises a first PNP transistor 134 and a second NPN transistor 136 connected in complementary Darlington configuration. The base of the first transistor 134 is connected to the common junction of the collector resistor 98 and 100 and the emitter thereof is connected to the positive bus 48 of the supply. The collector of the first Darlington transistor 134 is connected to the base of the NPN transistor 136, and the collector of this transistor is connected to the positive bus. The emitter of the second transistor 136 is connected through a parallel filter network 138 to the motor 10. The network 138 comprises a capacitor 140 shunted by an adjustable resistor 142 which serves to facilitate convenient adjustment of the average pulse duty cycle of the control transistors 134 and 136. Operating potential is supplied to the circuit by means of a battery 144, the positive terminal of which is connected to the positive bus 48 of the supply and the negative terminal being connected through an on-off single throw switch 146 of the negative bus 62 of the supply.

In operation, the circuit is energized and the motor 10 turned on by means of the on-off switch 146. The television set generates vertical retrace pulses at a rate of 60 per second and since two retraces occur for each television frame, the frame rate of the picture is 30 per second. The vertical synchronization signal is sensed by the tuned LC circuit 44, 46, and fed to the base of the amplifying transistor 52 where it is amplified and developed across the collector load resistor 60. The positive pulse energy across the load resistor 60 is stored in the capacitor 68 and upon reaching a predetermined level causes the unijunction transistor 70 to conduct. As previously mentioned, the capacitance ratio of the capacitors 64 and 68 determines the number of pulses before the unijunction will breakdown, and in the illustrated embodiment is selected to fire the unijunction once for every four vertical synchronization pulses. The capacitor compensating network 78 is initially adjusted to compensate for the leakage of the second capacitor 68 and thereafter does not require further adjustment. Upon conduction of the unijunction transistor 70 the emitter thereof is abruptly drawn to ground discharging the capacitor 68. This abrupt grounding of the coupling capacitor 84 produces a negative going pulse at the base of transistor 92, turning this transistor off and correspondingly turning the second transistor 96 on.

The pulses generated by the camera upon the closure of the reed switch 42 are coupled through the coupling capacitor 126, the limiting resistor 124 and through the isolation transformer 120. The negative going pulses are coupled to the base of the second transistor 96 turning this transistor off and also thereby lowering the base drive current upon the first transistor 134 of the Darlington amplifier, cutting off the second transistor 136. The second transistor 136 is turned on for every pulse from the frequency translating means 24, and turned off for every negative going camera pulse. In this servo loop connection the duty cycle of the switching means varies to maintain the camera speed at 15 fps synchronized at one fourth the television vertical retrace blanking frequency. The point of reed switch closure may be adjusted with respect to the shutter to maintain the desired phase angle between the television picture and the camera shutter if desired. Since the shutter angle is set at 180° and the camera operates at a 15 frames per second rate, when properly adjusted, the aperture will be locally obstructed for 1/30th of a second and open for 1/30 of a second. Thus, each local region of film will be exposed to exactly one TV scan, thereby eliminating "shutter bars" on the film. The shutter traverse time across the camera aperture may be slow compared to TV scan times, but under the conditions explained, the only effect will be that part of the film frame may contain a succeeding TV frame from the other part of the film frame. As explained, this feature is accomplished by synchronizing the speed of the camera shutter with the horizontal synchronization pulses of a television receiver, so that the film is exposed to portions of alternate frames of the television picture.

While this invention has been particularly shown and described with reference to a preferred embodiment thereof it will be understood by those skilled in the art that various changes in form and detail can be made without departing from the spirit and scope of the invention as set forth in the following claims.

What is claimed is:

1. An apparatus for synchronizing the operation of a motion picture camera with a television receiver to permit the filming of the television cathode ray tube image comprising:

signal generating means coupled to the camera shutter for generating a signal related to the movement of the shutter;

pulse detecting means for detecting the vertical retrace pulse signals generated by the television receiver;

comparison means for comparing the signal from the camera generating means with the signal from the vertical pulse detecting means and providing an output signal related thereto; and a camera motor control means receiving the output signal from said comparison means and serving to control the speed of movement of the camera shutter so as to maintain synchronization between the camera and the television receiver.

2. The apparatus of claim 1 which further includes frequency translating means for translating the frequency of the output of the vertical pulse detecting means to a second frequency said second frequency being compared with the output of said camera signal generating means for maintaining synchronization between the operation of the camera and the television receiver.

3. The apparatus of claim 2 wherein said vertical pulse detecting means comprises an inductance suitable for positioning adjacent the neck of the cathode ray tube of the television and serving to pick up the vertical retrace pulses applied to the cathode ray tube.

4. The apparatus of claim 3 wherein said inductance of said vertical pulse detecting means is capacitively tuned to the frequency of the vertical retrace pulses of the television set and wherein the voltage developed across said tuned circuit is amplified by means of an amplifier stage prior to frequency translation by said frequency translation means.

5. The apparatus of claim 2 wherein said frequency translating means comprises a frequency divider for providing an output signal frequency which is lower than the vertical retrace frequency.

6. The apparatus of claim 5 wherein said frequency divider is in the form of an energy storage counter providing a single output pulse for each four vertical retrace pulses.

7. The apparatus of claim 5 wherein said comparison means comprises a bistable multivibrator having a first input which is triggered by the output of said frequency divider and a second input of which is triggered by the output signal from said camera signal generating means.

8. The apparatus of claim 7 wherein said vertical pulse detecting means comprises an inductance suitable for positioning adjacent the neck of the cathode ray tube of the television set and serving to pick up the vertical retrace pulses applied to the cathode ray tube.

9. The apparatus of claim 8 wherein said frequency divider is in the form of an energy storage counter providing a single output pulse for each four vertical retrace pulses.

10. The apparatus of claim 9 wherein the camera includes a rotary shutter having a 180° shutter angle.

* * * * *